US00RE35844E

United States Patent [19]

Crowley

[11] E Patent Number: Re. 35,844

[45] Reissued Date of Patent: Jul. 14, 1998

[54] PAPER GUIDING METHOD AND APPARATUS

[75] Inventor: H. W. Crowley, Eliot, Me.

[73] Assignee: Roll Systems, Inc., Burlington, Mass.

[21] Appl. No.: 448,824

[22] Filed: May 24, 1995

Related U.S. Patent Documents

Reissue of:

[64] Patent No.: 5,213,246
Issued: May 25, 1993
Appl. No.: 580,210
Filed: Sep. 10, 1990

[51] Int. Cl.[6] ..... B65H 23/26

[52] U.S. Cl. ..... 226/88; 226/196

[58] Field of Search ..... 226/74, 88, 110, 226/196, 197; 242/548, 548.2, 568; 400/616.1

[56] References Cited

U.S. PATENT DOCUMENTS

| | | | |
|---|---|---|---|
| 3,072,309 | 1/1963 | Hill | 242/548 |
| 3,466,716 | 9/1969 | Hancock et al. | 226/197 |
| 3,558,109 | 1/1971 | Sofue | 226/88 |
| 3,588,346 | 6/1971 | Ramig, Jr. | 242/76 |
| 3,874,621 | 4/1975 | Blair et al. | 226/88 |
| 3,921,878 | 11/1975 | Zangenfeind | 226/109 |
| 4,136,808 | 1/1979 | Reba | 226/197 |
| 4,655,626 | 4/1987 | Ohazaki | 400/605 |
| 4,693,620 | 9/1987 | Harumatsu | 400/616.1 |
| 4,790,466 | 12/1988 | Ueno et al. | 226/74 |
| 5,037,016 | 8/1991 | Wingerter | 226/110 |
| 5,078,525 | 1/1992 | Kakuguchi | 226/88 |

FOREIGN PATENT DOCUMENTS

| | | | |
|---|---|---|---|
| 0884192 | 8/1943 | France | 226/196 |

*Primary Examiner*—John P. Darling
*Attorney, Agent, or Firm*—Cesari and McKenna, LLP

[57] ABSTRACT

A trough structure is provided for bending a web of paper widthwise to provide beam strength and controllability to the web of paper, for aiding in guiding the web of paper in a straight path. The trough structure causes the paper to curl widthwise to conform with the shape of the trough structure. The trough structure comprises a concave or convex lower wall upon which the paper flows, open ends through which the paper flows, and shoulders which attach to both sides of the lower wall and extend substantially horizontally from the sides of the lower wall to symmetrical positions above the lower wall. The shoulders act to contain the paper in the trough structure and guide the paper through the trough structure. A drive roll is provided for driving the paper through the trough structure. No buckling of the paper is caused when any slight misalignment occurs between the paper and the drive roll, and this slight misalignment is self-correcting due to the edge guiding function of the trough structure.

27 Claims, 4 Drawing Sheets

PAPER GUIDING METHOD AND APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a unique method and apparatus for guiding a web of material in a straight path.

2. Background of the Invention

When feeding a web of paper through printing and other value-added processes such as paper cutting and paper punching, it is desirable to keep the web of paper flowing straight. Widely used conventional means to accomplish this include tractor-feeding apparatuses wherein pins are provided which engage pinholes in the sides of the web of paper. Tractor-feed paper with pin-holes along the sides require an extra inch of paper when compared to standard 8 inch width paper. In addition, the use of pinholes requires that the paper be moved from paper mills to converters before it is usable by the end user. This tractor-feed technology currently processes more than $1 billion annually worth of paper, 10 percent or $100 million of which is wasted on the tractor-feed pinhole portion.

Therefore, it is an object of the present invention to provide an apparatus for guiding a web of paper in a straight line without the need for tractor-feed pinholes.

It is another object of the present invention to provide an apparatus that is compatible with pre existing tractor-feed devices.

It is a further object of the present invention to provide for an apparatus that will automatically realign any slightly misaligned paper during the feeding process.

SUMMARY OF THE INVENTION

To accomplish the foregoing and other objects, features and advantages of the invention, there is provided an improved method and apparatus for driving a web in a straight path which comprises means for bending a web widthwise in a trough shape for providing stiffness and controllability to said web, means for driving said web in the direction of its length, and means for guiding said web in said direction of its length. The trough shape has a cord length from side edge to side edge that is less than the width of the web when flat. In a preferred embodiment of the present invention, the web consists of paper.

More particularly, in accordance with the present invention, there is provided an apparatus for driving a web in a straight path wherein the means for bending comprises a trough structure. The trough structure causes the paper to curl widthwise to conform with the shape of the trough structure creating beam strength in the paper for controllability. The trough structure comprises a concave lower wall upon which the paper flows, open ends through which the paper flows, and shoulders which attach to both sides of the lower wall and extend substantially horizontally from the sides of the lower wall to symmetrical positions above the lower wall. The shoulders act to contain the paper in the trough structure and guide the paper through the trough structure. The means for driving includes a drive roll. The drive roll comprises a substantially round core which is adapted to rotate about an axis and is surrounded by an outer layer having a rubber-like texture.

BRIEF DESCRIPTION OF THE DRAWINGS

Numerous other objects, features and advantages of the invention should now become apparent upon a reading of the following detailed description taken in conjunction with the accompanying drawings in which.

DETAILED DESCRIPTION OF THE PREFERRED EMBODIMENT

The present invention employs the novel concept of bending a web of paper or other material widthwise to add stiffness and beam strength for controllability of the web. With the added stiffness and beam strength to the paper, unwanted buckling is avoided, and the paper can be guided easily.

The present invention employs a trough-shaped structure through which the paper flows for bending the paper in a corresponding trough shape and attached shoulders which engage the sides of the paper and guide it through the trough structure. The present invention eliminates the need for tractor-feed pinholes in the paper and provides for self-adjusting straightening of the paper when slight misalignment occurs.

Figure 7:
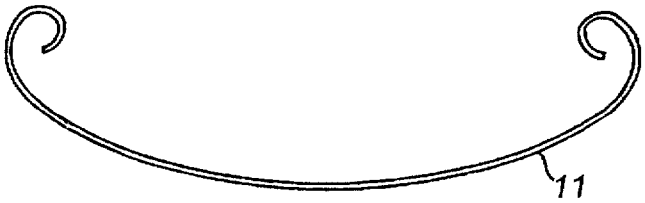
FIG. 7 is a front view of the paper in an alternative embodiment wherein the sides of the paper are curved inwards.
Figure 8:
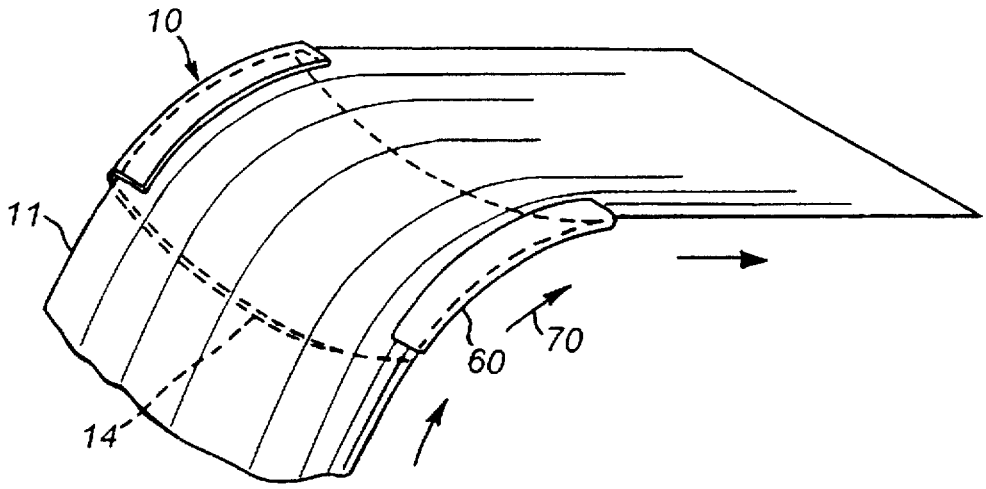
FIG. 8 is a perspective of the paper in an alternative embodiment wherein the paper is both bent in the trough shape structure and around a curve in the direction of travel.

Reference is now made to the drawings in which FIGS. 1–5a show a preferred embodiment of the present invention. Further details of this embodiment are set forth in FIG. 6. Alternative embodiments of the present invention are set forth in FIGS. 5b, 5c, 7 and 8, in which FIGS. 5b and 5c show alternative locations for the drive roll, and FIGS. 7 and 8 illustrate multiple bending.

Figure 1:
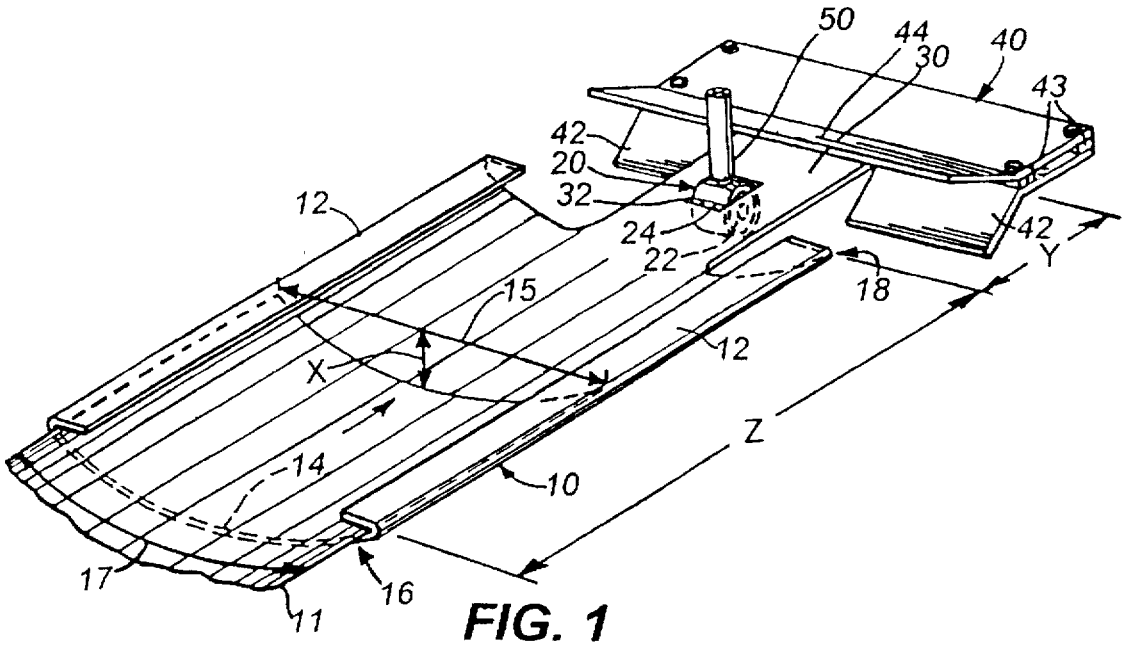
FIG. 1 is a perspective of the apparatus including the trough structure, drive roll, flat surface and straightening plows.

Referring now to FIG. 1, the apparatus is shown which generally includes the trough structure 10 that acts as a support for the web and through which the web of paper 11 flows, a drive roll 20 for driving the web of paper, a flat surface 30 upon which the paper flows after exiting the trough structure, and straightening plows 40. The present apparatus is adapted to be used with printers and other value-added processes. The present invention is compatible existing tractor-feed printers which will function without the need for the tractors.

Referring now to FIG. 1, the trough structure 10 is shown with the concave lower wall 14 and shoulders 12. The trough structure has a cord length 15 from side edge to side edge that is less than the width 17 of the paper when flat. The width of the paper, which may be 15 inches, is substantially the same as or slightly less than the curvature dimension of the trough structure, as represented by width 17 in FIG. 1, between the shoulders 12. During use, the paper web would flow through the trough structure 10 from the entrance end 16 to the exit end 18. The paper would conform to the shape of the trough structure. The shoulders 12 engage the edges of the paper for containing the paper in the trough structure and guiding the paper in a straight line. Due to the bending of the paper in the trough shape, beam strength is added to the paper which allows the paper to be guided easily.

Although a concave trough structure is utilized by the preferred embodiment, a convex structure could also be employed. Similarly, the beam strength of the web may be obtained by primarily guiding only the side edges of the web with no other support.

Figure 2:
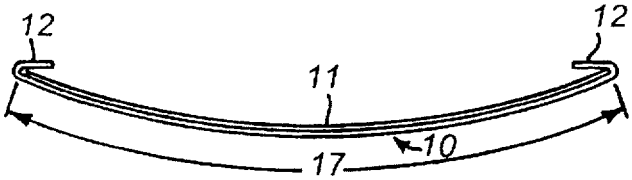
FIG. 2 is a front view of the paper illustrating the paper bent in a trough shape.

FIG. 2 illustrates a front view of the paper when bent in the trough shape and shoulders which engage the edges of the paper. The shoulders act to contain the paper and guide the paper.

Referring back now to FIG. 1, the web of paper would flow through the trough structure onto the flat surface 30. The flat surface 30 extends from the lower wall or support structure 14 of the exit end 18 of the trough structure 10 to the straightening plows 40. The flat surface 30 has an aperture 32 centrally disposed therein. Within the aperture 32 sits the drive roll 20. The drive roll 20 consists of a round core 22 which is motor driven and rotates about an axis, and an outer layer 24 of rubber-like material. The drive roll is located within the aperture 32 at a vertical level such that the rubber-like outer layer 24 of the drive roll 20 is just at or slightly above the level of the flat surface 30. The outer layer 24 of the drive roll 20 engages the underside of the paper as it flows upon the flat surface 30 and drives the paper upon rotation of the drive roll.

The outer layer of the drive roll may be comprised of 45/50 Durometer Rubber or polyurethane.

Note that the sides of a trough themselves may translate (FIG. 9), carrying the paper through a distance. In this way, the effects of friction upon the sides of the web are greatly reduced while accurate side guiding is still maintained. Moving side walls may be construed like a conveyor belt or similar continuously moving surface.

The paper, once exiting the trough structure, will flow upon the flat surface 30 and will seek its own geometry without external forces to restore it. The paper will, in a short distance, return to its flat natural state. This distance is established by the natural free energy bend of the paper. The straightness of the paper is also maintained by the inherent symmetry in the strength of the paper, so that any forces causing stress on one side of the paper will be balanced by relief of force on the opposite side of the paper.

Figure 3:
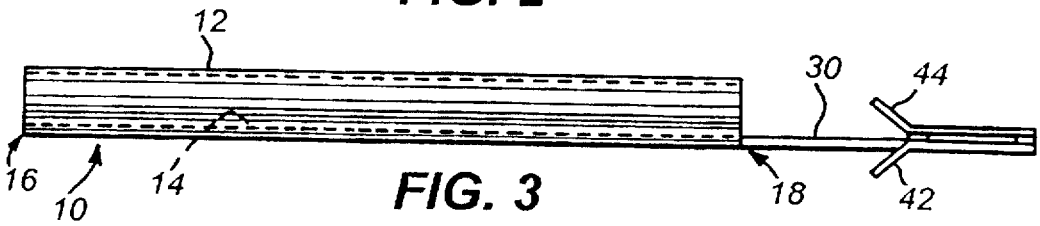
FIG. 3 is a side view of the apparatus illustrating the straightening plows.

To ensure that complete flattening occurs, the straightening plows 40 are provided at the end of the flat surface 30 opposite the trough structure 10 as illustrated in FIG. 3. The straightening plows 40 include an upper lip 44, a lower lip 42 and posts 43 to secure the two surfaces together at a spaced distance. The upper lip 44 and lower lip 42 project diagonally upward and downward respectively, both facing toward the trough structure 10, at approximately 45 degree angles from the horizontal flat surface 30. The paper enters the straightening plows 40 which flatten the paper out, allowing it to be worked on. This work may include cutting, punching, printing, or other value-added processes.

Figure 4:
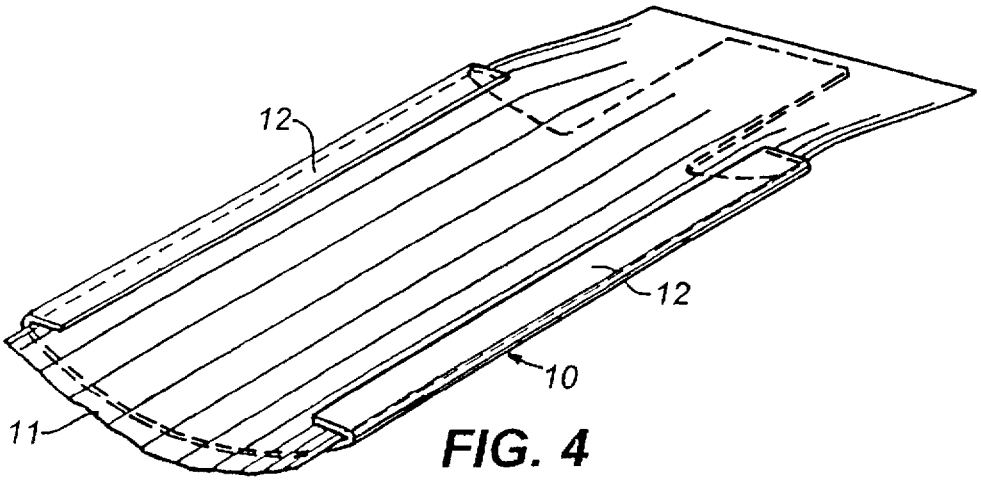
FIG. 4 is a perspective of the apparatus illustrating the paper exiting from the trough structure and straightening.

FIG. 4 shows the paper exiting from the trough structure and straightening out by natural bending forces. This occurs before the paper enters the straightening plows 40.

Figure 5A:
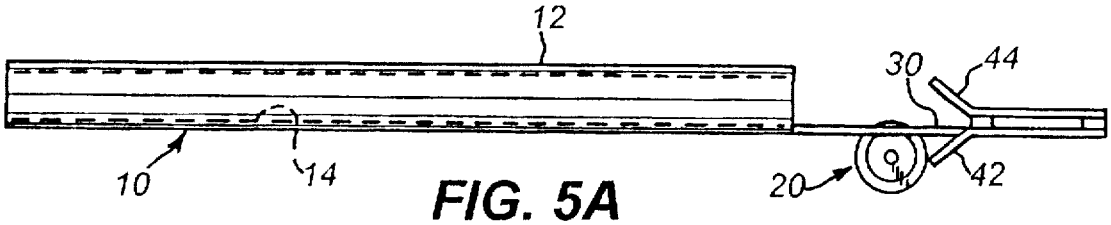
FIG. 5a is a side view of the apparatus illustrating a preferred location of the drive roll.
Figure 5B:
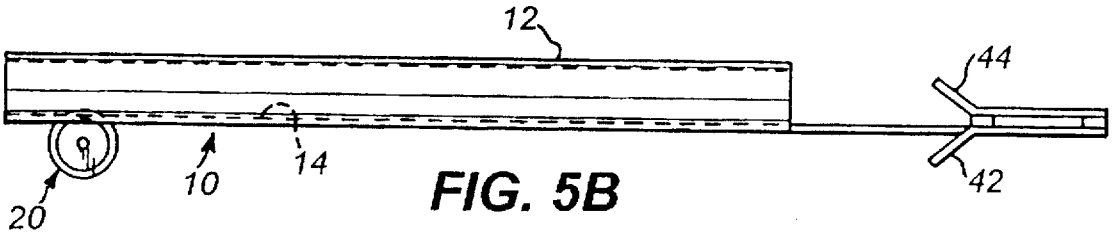
FIG. 5b is a side view of the apparatus illustrating an alternative location for a drive roll.
Figure 5C:
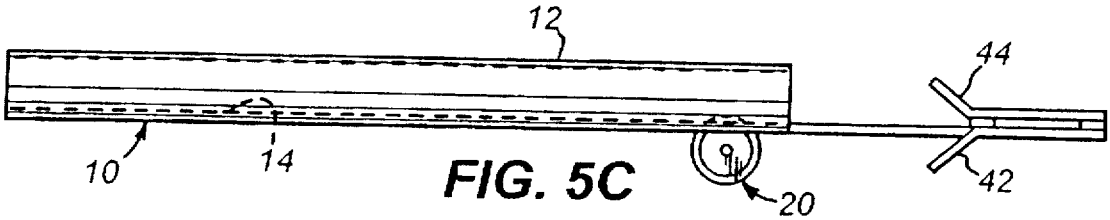
FIG. 5c is a side view of the apparatus illustrating a further alternative location for the drive roll.

FIG. 5a illustrates a preferred embodiment of the present invention in which the drive roll 20 is located at the flat surface 30 between the trough structure 10 and straightening plows 40. FIGS. 5b and 5c illustrate alternative locations for the drive roll 20, at the entrance end of the trough structure and at the exit end of the trough structure, respectively.

The drive roll is optimally located, as illustrated in FIG. 5a, at the flat surface 30 between the trough structure 10 and the straigtening plows 40. With the drive roll located at either the entrance end or the exit end of the trough structure, as opposed to the optimal location at the flat surface 30 between the trough structure 10 and the straightening plows 40 the following disadvantage will result: any misalignment of the paper with respect to the driver roll causes buckling of the paper in a direction 90 degrees to the direction of travel; this buckling is exacerbated by friction between the edges of the paper and the shoulders 12 of the trough structure. The position illustrated in FIG. 5c, at the exit end of the trough structure, is slightly more advantageous than the position illustrated in FIG. 5b, at the entrance end of the trough structure, but buckling was still found to exist upon misalignment of the paper with respect to the drive roll 20.

With the drive roll located at its optimal position, as illustrated in FIG. 5a, with slight misalignment of the paper with respect to the drive roll 20, no buckling will occur. In addition, the paper will automatically re-straighten itself due to the guiding of the paper by the trough structure. Thus, the objects of automatic re-straightening and no buckling are met with the drive roll located at the flat surface 30 between the trough structure 10 and the straightening plows 40.

Figure 6:
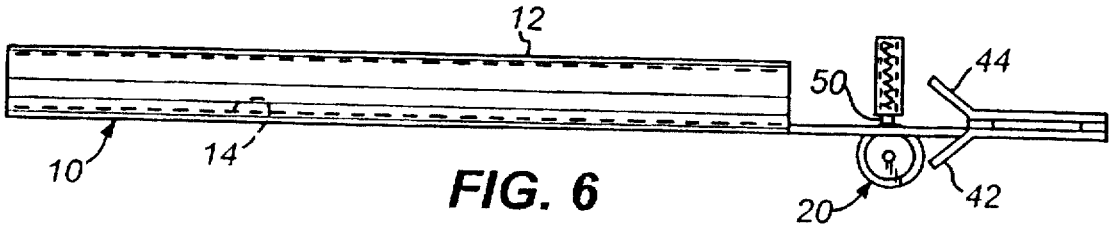
FIG. 6 is a side view of the apparatus illustrating the drive roll and pressure roll in particular.

In a preferred embodiment of the present invention, a pressure roll 5 is employed for providing pressure to the top side of the paper for maintaining contact with the drive roll, and is illustrated in FIG. 6. The pressure roll is spherical or otherwise round in cross section and is adapted to spin or rotate about a central axis. The pressure roll may be disposed of above the drive roll 20 such that the surface of the pressure roll would contact the drive roll and the drive roll would cause the pressure roll to spin or rotate. The paper flows between the pressure roll 50 and drive roll 20, the pressure roll 50 providing pressure to the paper so that the paper maintains contact with the drive roll.

For moderate misalignment angles of the paper with respect to the drive roll of 5 degrees or less, no buckling will occur and the self-correcting edge guiding function will work properly. With the pressure roll employed, as the angle of misalignment increases up to 15 degrees, the paper will begin to buckle but the edge positions of the paper will be unaffected. Thus, it is concluded that the apparatus works effectively with employment of the pressure roll 50, at least up to moderate misalignment angles.

In alternative embodiments of the present invention, as illustrated in FIGS. 7 and 8, the web of paper 11 is bent more than one time in order to create further stiffness. For each additional ben added to the web of paper 11, an additional surface is required to trap the paper. FIG. 7 illustrates an alternative embodiment wherein the sides of the paper 11 are curled inward to provide additional strength without requiring the space necessary to curve the entire width of the paper.

FIG. 8 illustrates an alternative embodiment wherein further bending of the paper 11 around a curved surface 60 in the direction of travel is provided. Note, as illustrated in FIG. 8, the bending provided by the concave lower wall 14 of the trough structure 10 remains in addition to the bending provided by the curved surface 60. The direction of travel of the paper 11 is shown by the arrows 70. Again, multiple bends can be made if multiple surfaces are provided to back up the paper. The bent paper has substantial strength once it turns a radius and therefore can accommodate substantial forces which may be needed to side-guide it. Thus, this device has widespread use with value-added processes such printers, paper cutting machines and paper punching machines.

The above-described benefits obtained through forming a web into a trough shape may also be derived without the use of a complete supporting trough structure. It is necessary only to specifically guide the edges of the web at a spacing distance that forms a trough shape. The natural beam strength of the web will provide the necessary stiffness to guide the web.

Figure 9:
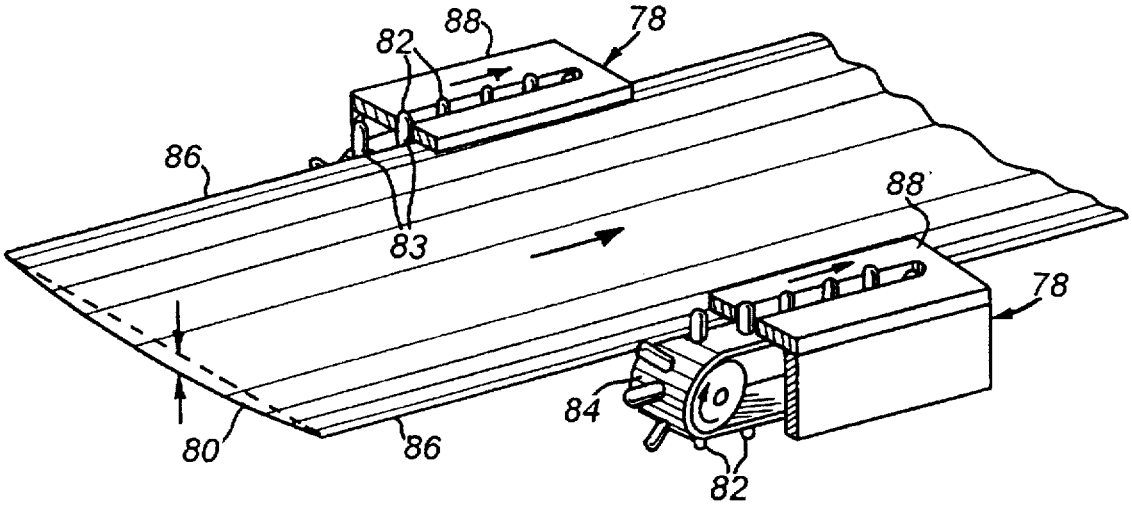
FIG. 9 is a perspective view of an alternative driving apparatus wherein the paper is formed into a trough shape by side force of conventional tractor feed pins and is driven by the pin belt without the need for holes.

An alternative apparatus for forming and guiding a trough shaped web 80 is shown in FIG. 9. This apparatus may actually utilize standard tractor feed units 78 having pins 82 mounted on a continuous drive belt 84. The pins 82 have inner facing edges 83 that contact the web edges 86 to retain them laterally under pressure, forming the web 80 into a trough. The drive belt 84 may include a highly frictional surface to grip the web, driving it as the belt moves. Each tractor feed unit 78 in this example also includes an upper shield 88. Each web edge 86 is disposed between this upper shield 88 and the belt 84 and is thus, restrained vertically with the shield acting as a trough shoulder.

Figure 10:
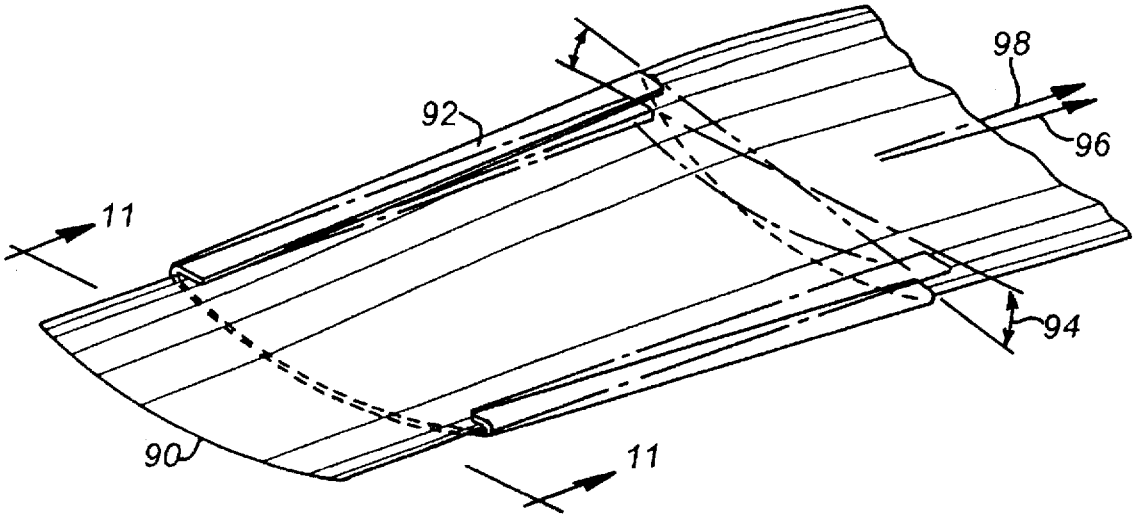
FIG. 10 is a perspective view of a method for directing the paper by warping the trough.
Figure 11:
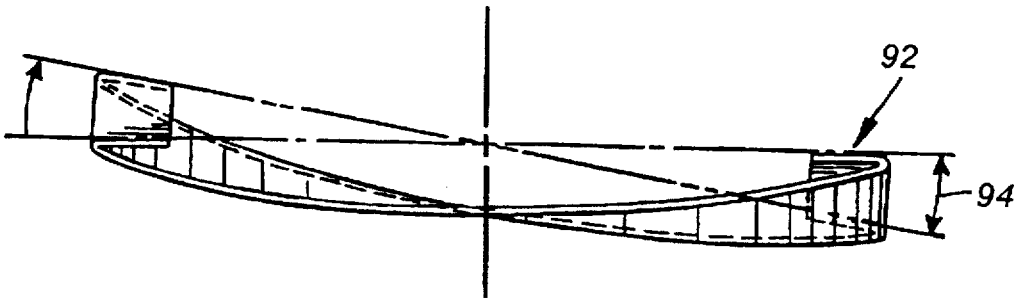
FIG. 11 is a front view of the warped trough of FIG. 10.

Note that it is possible with an embodiment such as FIG. 8 to incorporate a variable geometry directing system. FIGS. 10 and 11 disclose a method for directing a web 90 laterally by warping (twisting) the trough 92 along its length. By applying a predetermined twist angle 94, a predetermined degree of diversion 96 from the initial driving direction 98 is obtained. The trough, of course, may be warped only to its elastic limit, otherwise permanent deformation may occur. For larger diversions it may be possible to incorporate a segmented trough wherein one segment moves relative to another to obtain a sharp twist angle.

Tests were performed on the apparatus, the results of which are listed below:

1. Referring to FIG. 1, if the curvature in the trough structure, represented by at least dimension X, is large, then the distance Y of the flat surface 30 must be increased in proportion. Furthermore, a large curvature causes wrinkling and distortion of the paper all the way back to the entrance end 16 of the apparatus.
2. If the curvature in the trough structure is very small, there is much less wrinkling and distortion, but the paper will not push through the straightening plows as well. A preferred amount of curvature is represented by a dimension X equalling, on the order of 1¼ inches. This corresponds to a length Y of the flat surface 30 of 4 inches and a length of the trough structure Z of 17 inches. Moreover, the trough structure itself, as indicated previously, has a corresponding dimension of 15 inches as indicated by dimension 17 in FIG. 1.
3. Wrinkles in the paper are caused by the act of flattening the paper through the straightening plows 40 as well as any misalignment which puts edge pressure on the paper. Wrinkles can be minimized by adding hold downs which cause the paper to conform to the shape of the trough structure 10. A hold down could be as simple as a weighted strap against the surface of the paper.

Having now described a limited number of embodiments of the invention, it should now be apparent to those skilled in the art that numerous other embodiments and modifications thereof are contemplated as falling within the scope of the present invention as defined by the appended claims.

What is claimed:

1. An apparatus for driving a web in a defined path comprising:

trough structure means having one of a concave and convex surface and having shoulders for engaging opposing widthwise edges of a web positioned therein, the shoulders being positioned to maintain the web against a surface of the trough structure along a lengthwise direction, the web therein having a conforming trough shape in which a straightline spacing between the widthwise edges is less than a spacing between widthwise edges of the web when laid flat, the trough shape providing stiffness to the web and causing said web to curl widthwise to conform to the shape of the trough structure creating beam strength in said web for controllability and means for driving said web in the lengthwise direction along the trough structure, the means for driving including a drive roll having a substantially round core being motor driven and adapted to rotate about an axis of the core, and an outer layer having a rubber-like texture surrounding said core for engaging said paper and driving said paper upon rotation of said drive roll and, a flat surface positioned beyond said trough structure at one end thereof, upon which said web flows after flowing through said trough structure, said flat surface having an aperture disposed therein, the width of said aperture being greater than the width of said drive roll, said drive roll disposed out of the plane of said flat surface in said aperture so that said outer layer of said drive roll is at substantially the same level as said flat surface, for engaging the underside of said paper and driving said paper through said trough structure.

2. An apparatus as set forth in claim 1 further including web flattening means, said web flattening means including an upper lip and a lower lip, said web flattening means disposed at one end of said flat surface opposite said trough structure, said lips of said web flattening means straddle said flat surface and are adapted to receive said paper between said lips for straightening of said paper and returning said paper to its flat state.

3. An apparatus as set forth in claim 1 wherein said means for driving further includes a pressure roll, said pressure roll being of spherical shape and adapted to spin, said pressure roll located opposite said drive roll.

4. An apparatus as set forth in claim 1 wherein said means for driving further includes a pressure roll, said pressure roll being of spherical shape and adapted to spin, said pressure roll located opposite said drive roll such that said outer layer of said drive roll engages the surface of said pressure roll and wherein rotation of said drive roll causes spinning of said pressure roll.

said paper adapted to flow between the surface of said pressure roll and said outer layer of said drive roll, said pressure roll maintaining sufficient pressure for keeping said paper against said outer layer of said drive roll.

5. An apparatus for moving a web in a defined path comprising:

means for bending a web widthwise in a trough shape, the web being substantially flexible in a lengthwise direction when laid flat and being substantially rigid in a lengthwise direction when formed into said trough shape, said means for bending comprising a trough structure, said trough structure comprising one of a concave and convex support upon which said web flows, in a lengthwise direction, open ends through which said web flows, and shoulder means disposed relative to the sides of said support and which extend from said sides of said support to positions above said support, said shoulder means containing said web in said trough structure and guiding said web through said trough structure said shoulder means having sides which face said support and said sides engaging the edges of said web for containing said web in said trough structure and guiding said web in a defined path.

means for driving said web including a drive roll having a web gripping texture for engaging said web and driving said web; and a flat surface, said flat surface being attached to said trough structure at one end thereof, upon which said web flows after flowing through said trough, said flat surface having an aperture, the width of said aperture being substantially equal to or greater than the width of said drive roll, said drive roll disposed out of the plane of said flat surface in said aperture such that said outer layer of said drive roll is positioned at substantially the same plane as said flat surface, for engaging said web and moving said web through said trough structure.

6. An apparatus as set forth in claim 5 wherein said flat surface being contiguous with said trough.

7. An apparatus as set forth in claim 5 wherein the curvature of the trough structure is defined by a range of radii between an infinite radius and a radius defined by an arc length on the order of 15 inches and a distance along the radius between the cord and the arch on the order of 1.25 inches.

8. An apparatus for guiding a web in a defined path comprising:

a trough shaped guiding structure having shoulders for engaging widthwise edges of a web for creating a lengthwise bend along a web to provide stiffness and controllability thereto, said web having a cord length less than its flat width; a substantially flat surface proximate an end of the trough structure, the web passing over the substantially flat surface; and an aperture positioned on the flat surface and a drive roll positioned in the aperture that engages the web to drive the web in the lengthwise direction.

9. An apparatus as set forth in claim 8 further comprising a driving belt [means] disposed proximate to [end] *and* aligned with at least one of said shoulders.

10. An apparatus as set forth in claim 9 wherein said driving belt means includes a plurality of projections therefrom for abutting an edge of said web.

11. An apparatus as set forth in claim 9 wherein said driving belt means comprises a tractor-pin feed mechanism having a conveyor belt with pins projecting therefrom, said pins having inner facing edges abutting an edge of said web.

12. An apparatus as set forth in claim 8 wherein said trough structure comprises a flexible trough for directing an output end of said web to a plurality of predetermined locations.

13. A method for driving a web in a defined path comprising the steps of:

distorting a web widthwise in a trough shape by engaging opposing widthwise web edges to maintain the web against a trough shaped surface for providing stiffness and controllability in a lengthwise direction to said web, said trough shape having a cord length less than the width of the web when flat, and the web being substantially flexible along a lengthwise direction when flat and being substantially rigid along a lengthwise direction when formed into a trough shape, providing a substantially flattened surface proximate an end of the trough shaped surface so as to cause the web to become substantially flat along the substantially flattened surface, driving said web in said lengthwise direction including providing a drive member at the substantially flat surface for engaging and propelling the web in a lengthwise direction, and guiding said web in said lengthwise direction through said trough shaped surface and onto said substantially flattened surface.

14. [An] *A* method as set forth in claim 13 wherein said web comprises a web of paper.

15. [An] *A* method as set forth in claim 14 wherein the step of bending is accomplished by providing a trough structure, said trough structure causing said paper to curl widthwise to conform with the shape of the trough structure, creating beam strength in said paper for controllability, said trough structure comprising one of a concave and convex support upon which said paper flows, open ends through which said paper flows in said direction of its length, and a shoulder along at least one side of said trough structure and which extends from said side of said trough structure to an opposite side of said trough structure for containing said paper in said trough structure.

16. A method as set forth in claim 15 wherein said step of guiding is accomplished with said trough structure, said shoulder having an underside which faces said structure, said underside of said shoulder engages the edges of said paper for guiding said paper in a defined path.

17. A method as set forth in claim 14 wherein the step of driving is accomplished by providing a drive means, said drive means comprising a substantially round core, said substantially round core being driven and adapted to rotate about an axis, and an outer layer having web gripping texture surrounding said core for engaging said paper and driving said paper upon rotation of said drive roll.

*18. An apparatus for guiding a web in a defined path comprising:*

*a tractor pin feed mechanism comprising a left tractor pin feed belt with pins projecting therefrom and a right tractor pin feed belt with pins projecting therefrom, the pins of the left tractor pin feed belt and the pins of the right tractor pin feed belt each having inner facing edges that are aligned along respective lines, the respective lines being substantially parallel to each other and being spaced apart at a first distance; and*

*wherein the first distance is less than a second distance that is equal to a spacing between widthwise edges of a web when the web is substantially flat, the inner facing edges of the pins of the left belt and the right belt being constructed and arranged to abut an edge of the web and form the web into a trough-shape to provide stiffness and controllability to the web as it passes through the tractor pin feed mechanism.*

*19. The apparatus as set forth in claim 18 further comprising a tractor pin feed drive that moves the pins in conjunction with the web as the web passes therebetween.*

*20. The apparatus as set forth in claim 18 further comprising an upper shield located adjacent the pins of at least one of the left tractor pin feed belt and the right tractor pin feed belt, the upper shield maintaining a widthwise edge of the web adjacent the pins of the at least one of the left tractor pin feed belt and the right tractor pin feed belt.*

*21. The apparatus as set forth in claim 20 wherein the upper shield extends away from the pins of the at least one of the left tractor pin feed belt and the right tractor pin feed belt and toward the pins of an opposing tractor pin feed belt.*

*22. A method for driving a web in a defined path comprising the steps of:*

*providing a web having widthwise edges that define a web width when the web is substantially flat and driving the web in a first direction;*

*engaging the web along the widthwise edges with opposing sets of pins having inner facing edges that abut a respective of the widthwise edges of the web and that move in conjunction with a movement of the web in the first direction; and*

*locating the opposing sets of pins so that the inner facing edges of the pins engage respective widthwise edges of the web so as to form the web therebetween into a trough shape wherein a distance between the widthwise edges of the web in the trough shape is less than the web width when the web is substantially flat, and wherein the trough shape provides stiffness and controllability to the web.*

*23. The method as set forth in claim 22 further comprising providing a plate adjacent at least one of the sets of pins and engaging a respective of the widthwise edges of the web with the plate to maintain the respective of the widthwise edges adjacent the plate.*

*24. The method as set forth in claim 23 wherein the step of engaging includes driving the web based upon a movement of the pins.*

*25. A method for driving a web in a defined path comprising the steps of:*

*directing a web having widthwise edges, that define therebetween a web width when the web is substantially flat, between pair of opposing moving upright surfaces having inner facing edges that engage the widthwise edges; and*

*locating the opposing moving upright surfaces so that the inner facing edges on the opposing moving upright surfaces are positioned at a spacing from each other that is less than the web width, wherein the step of directing thereby includes forming the web into a trough shape that provides stiffness and controllability to the web.*

*26. The method as set forth in claim 25, further comprising providing retaining surfaces that are positioned adjacent the upright surfaces and thereby maintaining the widthwise edges in engagement with the upright surfaces.*

*27. A method for driving a web in a defined path comprising the steps of:*

*providing a web having widthwise edges defining a web width when the web is substantially flat and driving the web in a first direction;*

*engaging the web along with widthwise edges with a pair of opposing upright surfaces that are spaced at a distance less than the web width to form the web into a trough-shape for increased stiffness and controllability; and*

*wherein the step of driving includes engaging a first face of the web at the location upon the web wherein the web is formed in the trough-shape with a drive roll and engaging an opposing second face of the web with a pressure roll located adjacent the drive roll.*

* * * * *